May 18, 1965  H. W. BROWN, SR  3,183,534
HYDRAULIC FEED MECHANISM WITH MEANS TO CONTROL SAME
Filed Sept. 12, 1961  2 Sheets-Sheet 1

INVENTOR.
HARRY W. BROWN, SR.
BY Woodling, Krost,
Granger and Rust,
ATTORNEYS

May 18, 1965  H. W. BROWN, SR  3,183,534
HYDRAULIC FEED MECHANISM WITH MEANS TO CONTROL SAME
Filed Sept. 12, 1961  2 Sheets-Sheet 2

INVENTOR.
HARRY W. BROWN, SR.
BY Woodling, Krost,
Granger and Rust,
ATTORNEYS

3,183,534
HYDRAULIC FEED MECHANISM WITH MEANS TO CONTROL SAME
Harry W. Brown, Sr., Willowick, Ohio, assignor to The National Acme Company, a corporation of Ohio
Filed Sept. 12, 1961, Ser. No. 137,624
10 Claims. (Cl. 10—105)

The invention relates in general to feed mechanisms such as those for machine tools and, more particularly, to a mechanism to give a slow feed in conjunction with a threading machine.

The typical threading machine of the prior art is one which utilizes some form of lead screw which moves a threading tool along an axis to thread a workpiece to have a thread of the same pitch as the lead screw. Such a machine has the disadvantage of being limited in speed because of the limitations of the lead screw and cooperating nut and has limitations of wear on the lead screw. Also, if a split nut is used in cooperation with the lead screw, this causes additional wear and additional problems of proper meshing of the split nut with the lead screw which is usually of a square or buttress thread. Additionally, a lead screw has the limitation of inflexibility of thread pitch being formed since it necessarily must be directly in accordance with the lead screw and the available change gears. Other prior art devices have used hydraulic power means such as hydraulic cylinders to provide a variable feed rate, but these usually have had to operate against the force of a heavy spring and, thus, are large and cumbersome and, in addition, the feed rate will vary in accordance with the viscosity of the oil or other hydraulic fluid.

Accordingly, an object of the invention is to provide a machine wherein a slide is movable on a frame by hydraulic power means, a hydraulic control valve is provided and connected between a hydraulic pressure source and the hydraulic power means to control movement of same, a master thread is cooperable with a stylus, the control valve has a valve spool and body connected for relative movement in accordance with relative axial movement of the stylus and master thread, the valve spool and body are connected for relative movement in accordance with the axial movement of the slide on the frame, and means is provided to relatively rotate the master and stylus to effect relative axial movement of said stylus and master thread to relatively move said valve spool and valve body and, thus, move said slide in direct accordance with the master thread. The movement of the slide may be used in a threading machine to provide relative axial movement between a threading tool and a workpiece. Also, the relative rotation of the master and stylus may be in accordance with the relative rotation given to the tool and workpiece so that the workpiece is threaded in direct accordance with the master thread.

Another object of the invention is to provide a form of tracer control for a feed mechanism and especially for threading a workpiece.

Another object of the invention is to provide a feed mechanism establishing a variable feed rate.

Another object of the invention is to establish a feed mechanism which will give any desired feed rate.

Another object of the invention is to provide a feed mechanism especially for a threading machine wherein hydraulic power is utilized to give a constant feed regardless of changes in viscosity of the hydraulic fluid.

Another object of the invention is to provide a tracer control system with a follow-up for a closed loop servo motor system to provide a hydraulic feed mechanism especially for threading.

Other objects and a fuller understanding of the invention may be had by referring to the following description and claims, taken in conjunction with the accompanying drawings, in which:

Figure 1:
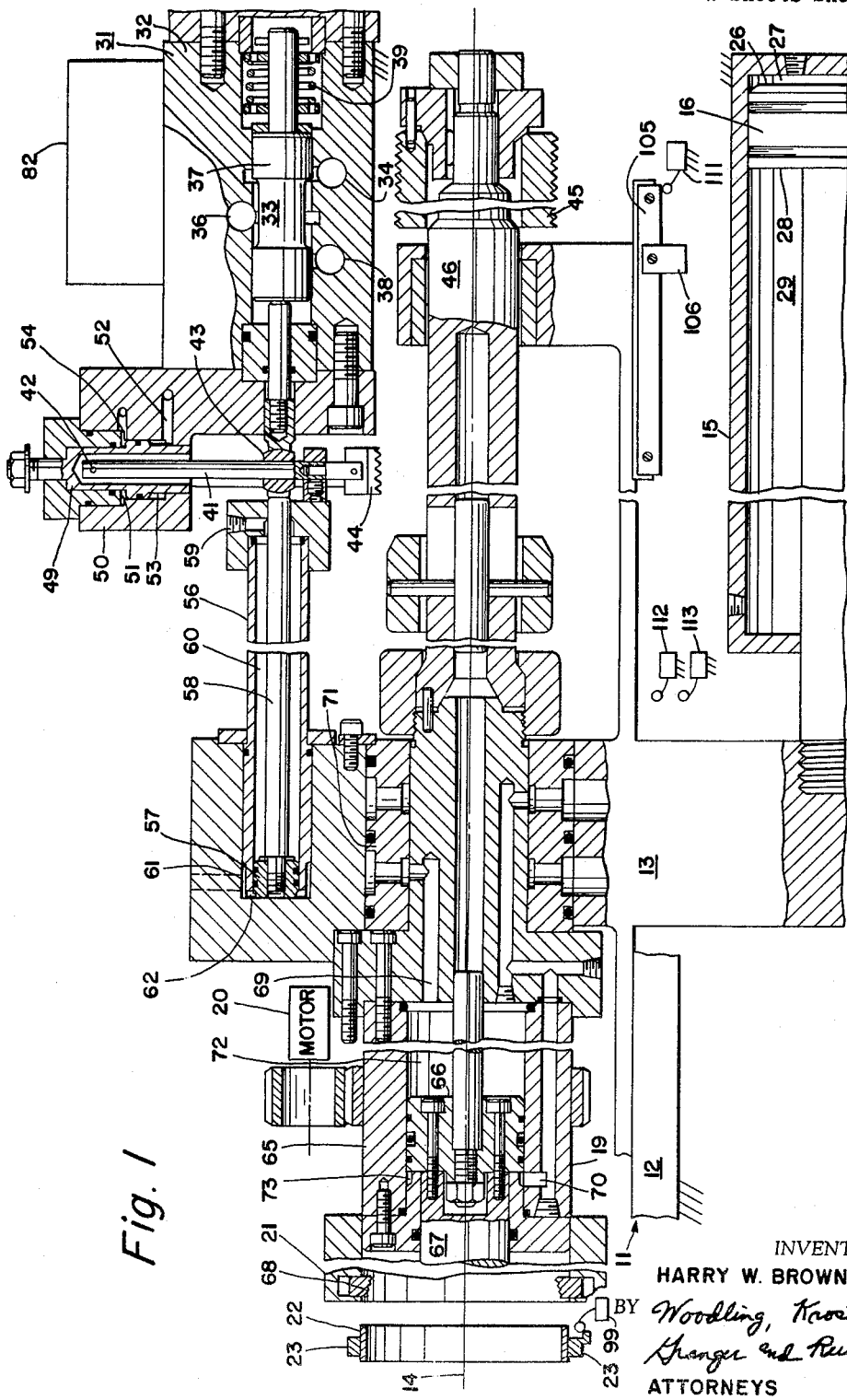
FIGURE 1 is a longitudinal sectional view of a machine embodying the invention.

The invention is shown as being embodied in a threading machine 11. This is one illustration of a practical machine in which the feed and traverse mechanism of the invention may be utilized. The threading machine 11 includes a stationary frame 12 on which a slide 13 is mounted for sliding movements parallel to an axis 14. A main hydraulic cylinder 15 may be fixed relative to the frame 12 and a piston 16 connected to reciprocate the slide 13. The slide 13 rotatably mounts a spindle 19 driven by a motor 20 carried on the slide 13. The spindle 19 carries a threading head or threading tool 21 to perform a thread forming action on a workpiece 22. This workpiece may be of any type and it is shown as a pipe receiving an external tapered thread. The workpiece 22 may be clamped in a fixed manner relative to the frame 12 by a clamp 23.

The hydraulic cylinder and piston 15, 16 is a differential cylinder having a large area face 26 on the piston establishing with the cylinder 15 a first large area chamber 27. The piston has a small area face 28 establishing with the cylinder 15 a second small area chamber 29.

A servo valve or control valve 31 has a body 32 mounted on the frame 12. A valve spool 33 is mounted for reciprocation within the valve body 32 along an axis parallel to the axis 14. The valve body 32 has a pressure inlet port 34 connected to a constant pressure pump 35 as shown in FIGURE 2. A control outlet port 36 is provided in the body 32 with fluid flow through this control port 36 controllable or restrictable by a land 37. A tank return port 38 is also provided in the body 32. A spring 39 urges the valve spool 33 to the left, as viewed in FIGURE 1.

A stylus rod 41 is pivoted at 42 relative to the valve body 32 and acts through a ball joint 43 on the valve spool 33. The stylus rod 41 carries a stylus tip 44 which is cooperable with a master thread 45. The master thread 45 is fixedly carried on an arbor 46 which rotates with the spindle 19. The master thread may be of any desired length, long enough to provide the desired length of thread on the workpiece 22. The stylus tip 44 may be more than a single tip and, as shown, is a portion of a complementary thread to mesh with several threads on the master thread 45.

The pivot 42 is carried in a piston 49 of a lateral cylinder 50. This lateral piston 49 provides lateral movement to the stylus rod 41 to effect engagement or disengagement between the stylus tip 44 and the master thread 45. The lateral piston 49 is a differential piston having a slightly larger area chamber 51 at the top, as viewed in FIGURE 1. A pressure inlet port 52 is connected to a smaller area chamber 53 at the bottom of this piston. A restricted control port 54 is connected to the larger area chamber 51.

The slide 13 carries a rapid traverse cylinder 56 with a piston 57 therewithin. A piston rod 58 may extend outwardly to the right of the cylinder 56 for rapid traverse movements of the slide 13, as explained below. The rapid traverse cylinder 56 is a differential cylinder and has a pressure inlet port 59 connected to a small area chamber 60. A control port 61 is connected to a large area chamber 62.

A reset cylinder 65 is formed as a part of the spindle 19 and houses a reset piston 66. A piston rod extends to the left from this piston 66, as viewed in FIGURE 1, and is connected to a mechanism, not shown, within the threading head 21 to collapse and reset thread forming tools 68 in the head 21. This may be conventional structure and the collapsing action for this die head would be to move the thread forming tools 68 outwardly at the termination of the threading action to avoid the necessity for backing the threading die head off the workpiece. The reset piston 66 is shown in the reset position with the thread forming tools reset to a position ready for threading. If the piston 66 is moved to the right, as viewed in FIGURE 1, this collapses the tools 68 through any desired mechanism. The reset cylinder 65 is provided with a reset inlet port 69 leading to a large area chamber 72 and with a collapse inlet port 70 leading to a small area chamber 73. These ports are in the rotating spindle 19 and, thus, lead to the slide 13 through a distributor 71.

*Operation*

Figure 2:
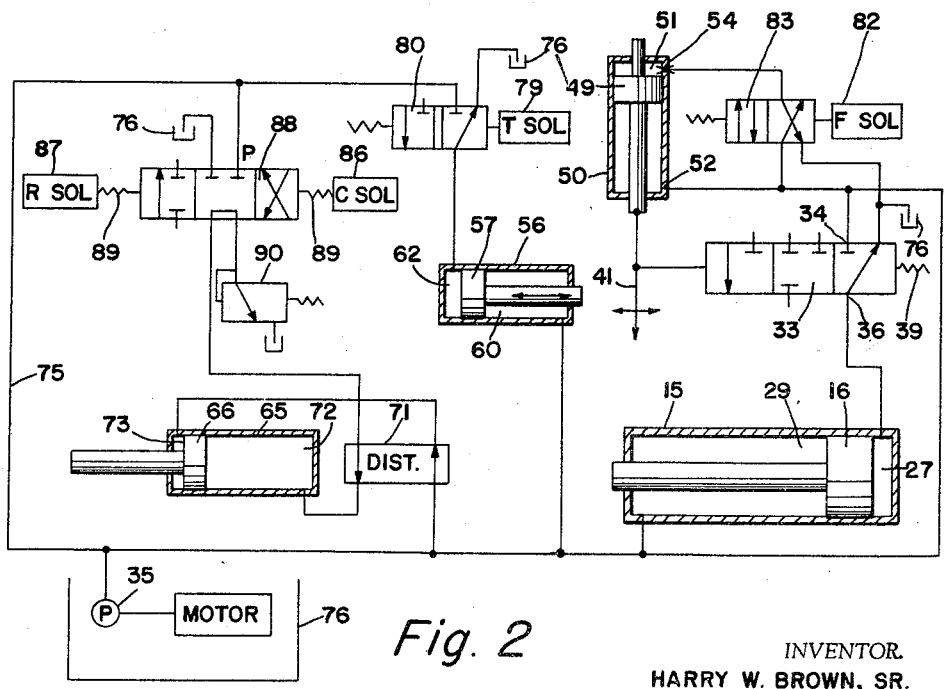
FIGURE 2 is a schematic diagram of the hydraulic circuit.

The threading machine 11 is adapted to have first a rapid traverse movement to the left, as viewed in FIGURE 1, in order to bring the threading head 21 into close proximity to the workpiece 22 to be ready for the actual threading operation. In FIGURE 1 the workpiece 22 is shown close to the threading head 21 for compactness in the drawing, but the actual space therebetween in the loading position of the workpiece 22 may be in the order of six inches, for example, which will be the length of stroke of the rapid traverse piston 57. The threading machine first moves in a rapid traverse movement to the left this pre-determined distance, e.g. six inches, and then feeds toward the workpiece for the threading operation. This feed is provided by the feeding mechanism of the invention and is a form of tracer control governed by the master thread 45 through the stylus 41 and servo valve 31. The valve body 32 is stationary on the frame as is the workpiece 22. The slide 13 reciprocates parallel to the axis 14 about which the spindle 19 rotates, and carries this spindle 19 and threading head 21. Axial movement of the slide 13 imparts an axial movement to the master thread 45. Additionally, rotation of the spindle 19 by the motor 20 will rotate the master thread 45 as well as the threading head 21. With the stylus tip 44 in engagement with the master thread 45, any rotation thereof causes axial movement of the stylus tip 44 axially of the master thread 45. If the master thread 45 is a right hand thread, this will provide movement to the right for valve spool 33. This will change the hydraulic flow to the main cylinder 15, causing the piston 16 to move to the left at a feed rate. This moves the slide and moves the master thread axially to provide a follow-up condition for a closed loop servo system.

Figure 3:
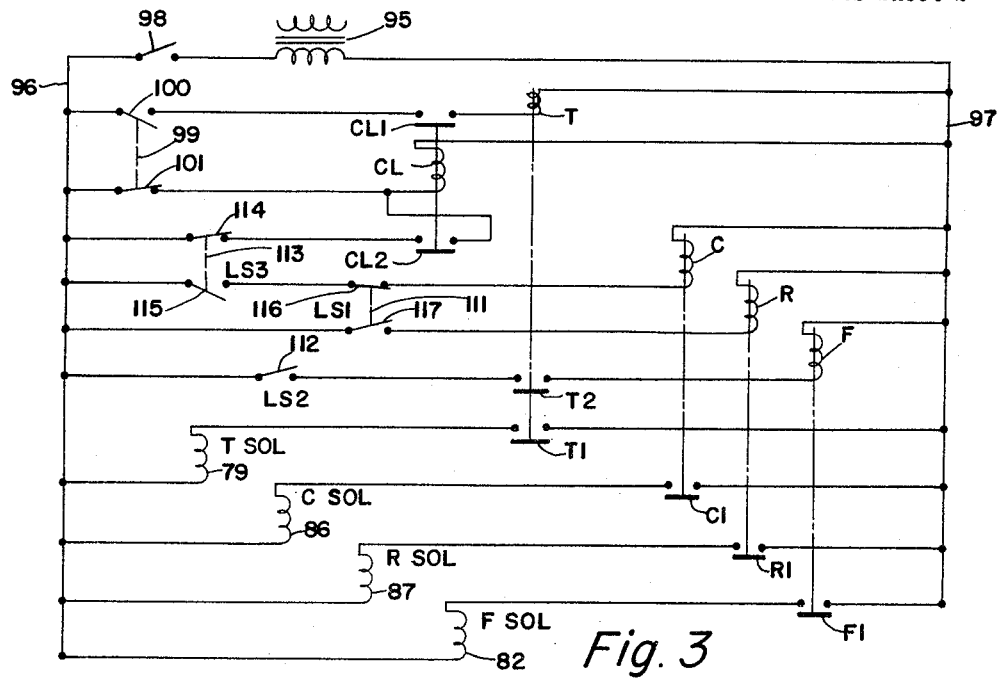
FIGURE 3 is a schematic electrical diagram.

FIGURES 2 and 3 show the hydraulic and electrical circuit interconnections for the threading machine 11. FIGURE 2 shows the main hydraulic cylinder 15, the reset cylinder 65, the rapid traverse cylinder 56 and the lateral cylinder 50. Each of these cylinders is a differential cylinder and the constant pressure pump 35 delivers pressure through a pressure conduit 75 directly to the small area chambers of each of these four hydraulic cylinders. FIGURE 2 shows the servo valve spool 33 diagrammatically, as under control of the stylus 41 with a normal position as established by the valve spring 39. This is a three-way valve 31 and, hence, diagrammatically it is shown as having three sections to illustrate the flow of hydraulic fluid in each of the three positions. This servo valve 31 has a central position wherein all fluid flow is blocked. The leftmost position of this valve spool 33 is as shown in FIGURE 2 as established by the valve spring 39 which connects the large area chamber 27 to the tank or sump 76. If the valve spool 33 is moved to the rightmost position, the pressure conduit 75 is connected to this large area chamber 27 and this will overcome the force caused by the same pressure in the small area chamber 29, hence, this main hydraulic piston 16 will move to the left. This, of course, moves the slide 13 to the left. When the valve spring 39 overcomes any force on the valve spool 33, this spool is moved to the left of the neutral position, thus connecting the large area chamber 27 to the tank and, thus, the main hydraulic piston 16 will return toward the right.

A traverse solenoid 79 is connected to actuate a traverse valve spool 80. With the traverse solenoid 79 de-energized, this valve spool 80 is normally spring urged to the left to the position shown in FIGURE 2. In this position, the pressure in the small area chamber 60 keeps the traverse piston 57 to the left with the large area chamber 62 connected to the tank 76. Upon energization of the traverse solenoid 79, the valve spool 80 moves to the right and the pressure conduit 75 is connected to the large area chamber 62 to move the piston 57 to the right. With the threading machine 11 in the position shown in FIGURE 1, this means that the piston rod 58 will abut the stylus 41 to move the servo valve spool 33 to the right. This provides rapid traverse movement of the main piston 16 toward the left.

A feed solenoid 82 is connected to actuate a feed valve spool 83. When so actuated, this valve spool moves to the right from the spring urged position shown in FIGURE 2 and, thus, the pressure conduit 75 is connected to the large area chamber 51 of the lateral cylinder 50. This moves the lateral piston 49 downwardly to cause the stylus tip 44 to engage the master thread 45. In this case, the pressure inlet is through the restricted control port 54 which is a restricted orifice and this, together with the only small difference in areas on the two faces of the piston 49 effects a slow movement rather than a rapid downward movement of the piston 49. This gives a form of time delay and also a slow cushioning of engagement of the stylus tip 44 with the master thread 45. De-energization of the feed solenoid 82 permits the return spring to move the feed valve spool 83 to the left to the position shown in FIGURE 2. This connects the larger area chamber 51 to the tank 76 for upward return movement of the lateral piston 49.

A collapse solenoid 86 and a reset solenoid 87 are connected in opposition for actuation of a reset valve spool 88. Valve springs 89 establish a neutral center position of this valve spool 88 when neither solenoid is energized. In this neutral position, as shown in FIGURE 2, the pressure conduit 75 is blocked and the large area chamber 72 of the reset cylinder 65 is connected to the tank through a pressure relief valve 90 which may be set at some suitable value, for example 50% of the system pressure. This maintains sufficient pressure in the large area chamber 72 to urge the piston 66 to the left in the reset position. When the collapse solenoid 86 is energized, this moves the valve spool 88 to the right and, thus, the fluid in the large area chamber 72 is connected to the tank 76 and, thus, pressure fluid in the small area chamber 73 moves the reset piston 66 to the right. As stated above, this operates some mechanism, not shown, to collapse the threading tools 68 in the threading head 21. When the collapse solenoid 86 is de-energized and the reset solenoid 87 is energized, this moves the valve spool 88 to the left which supplies pressure fluid to the large area chamber 72 to move the reset piston 66 to the left to effect resetting of the threading head 21.

FIGURE 3 shows the electrical circuit diagram wherein a transformer 95 energizes lines 96 and 97 through a control switch 98. A clamp switch 99 is mounted to be actuated by the clamp 23 which clamps the workpiece 22. This clamp switch 99 has normally open contacts 100 and normally closed contacts 101. A traverse relay T is connected in series with contacts 100 and contacts CL1 of a clamp relay CL, between lines 96 and 97. The clamp relay CL is connected in series with the contacts 101 between lines 96 and 97. The circuit includes first, second and third limit switches 111, 112 and 113, respectively. The third limit switch 113 has normally closed contacts 114 and normally open contacts 115. The clamp relay CL is also connected through clamp relay contacts CL2 and contacts 114 between the lines 96 and 97. The first limit switch 111 has normally closed contacts 116 and normally open contacts 117. A collapse relay C is connected in series with contacts 115 and 116 between lines 96 and 97. A reset relay R is connected in series with contacts 117 between lines 96 and 97. The second limit switch 112 is a normally open switch and is connected in series with traverse relay contacts T2 and in series with a feed relay F between lines 96 and 97. The traverse solenoid 79 is connected in series with normally open traverse relay contacts T1 between lines 96 and 97. The collapse solenoid 86 is connected between lines 96 and 97 through normally open collapse relay contacts C1. The reset solenoid 87 is connected between lines 96 and 97 through normally open reset relay contacts R1. The feed solenoid 82 is connected between lines 96 and 97 through normally open feed relay contacts F1.

Sequence of operation

The FIGURES 2 and 3 taken in conjunction with FIGURE 1 illustrate the preferred method of operation of the threading machine 11. Let it be assumed that the threading machine is in the position shown in FIGURE 1, which is the position ready to load a workpiece. When the control switch 98 is closed, this energizes the electrical circuit of FIGURE 3. A circuit will be established through the reset relay R to energize same because the slide 13 is retracted to the right so that a traverse dog 105 actuates the first limit switch 111. This closes reset relay contacts R1 and energizes the reset solenoid 87. This shifts the valve spool 88 to the left, as viewed in FIGURE 2, establishing the reset piston 66 in the leftmost position, if not already in this position, to reset the threading head 21 ready for a thread forming operation. Assuming no workpiece 22 is in position, the clamp switch 99 is in an unactuated position as shown in FIGURE 3. Accordingly, the clamp switch contacts 101 are closed to energize the clamp relay CL. This closes the holding contacts CL2 to maintain energization of the clamp relay CL.

When a workpiece 22 is clamped in a fixed position on the frame 12 by the clamps 23, then the clamp switch 99 is actuated. The clamp switch contacts 100 are then closed to energize the traverse relay T. This closes the contacts T1 to energize the traverse solenoid 79. Energization of this solenoid moves the valve spool 80 to the right and, hence, the traverse piston 57 is moved by hydraulic pressure to the right. This pushes the servo valve spool 33 to the right, opening wide the fluid communication between the pressure inlet port 34 and the control port 36. Accordingly, the main hydraulic piston 16 rapidly moves to the left for a rapid traverse advance of the head 21 toward the workpiece 22. This rapid traverse advance continues until the piston 57 bottoms at the end of the traverse cylinder 56. At the beginning of the rapid traverse movement, the first limit switch 111 will be de-actuated but this does not change any operating conditions at this time. The switch contact 117 is opened and the reset relay R and reset solenoid 87 are de-energized but the reset piston 66 remains in its leftmost position.

Just prior to the bottoming of the rapid traverse piston 57 on the right end of the cylinder 56, the second limit switch 112 is actuated in some suitable manner, for example by the traverse dog 105. This energizes the feed relay F through the previously closed contacts T2. This energization closes the contacts F1 and energizes the feed solenoid 82. This causes the lateral piston 49 to move downwardly at a restricted rate caused by the restricted orifice 54. This restricted rate assures that the rapid traverse movement will have ceased by the time the stylus tip 44 engages the master thread 45. The master thread 45 is being rotated by the motor 20 which also rotates the threading head 21. Rotation of this master thread 45 moves the stylus tip axially thereof to the right, assuming a right hand thread on the master 45. This rightward movement moves the servo valve spool 33 to the right opening fluid communication to the large area chamber 27 and, thus, the main piston 16 moves leftwardly. This is at a slow feed rate directly in accordance with the master thread 45. If there should be any change in rotational speed of this master thread 45, it is immediately reflected in a change in restriction of fluid flow through the servo valve 31 to, accordingly, change the rate of movement of the feed cylinder 15. Preferably, the motor 20 is a constant speed motor and this will give a constant leftward feed to the threading head 21 in accordance with the master thread 45.

The threading operation may be of any length, it being necessary only to make the master thread of a corresponding length. The threading head may have internal mechanism to produce a taper thread, for example, so as to form a typical pipe thread. This threading action may be in the order of two to four inches, for example, for a four to six inch diameter pipe workpiece 22 and the threading operation is terminated by the feed dog 106 actuating the third limit switch 113. This closes the third limit switch contacts 115 to energize the collapse relay C through the now closed first limit switch contacts 116. The collapse solenoid 86 is thus energized to move the reset valve spool 88 to the right and, hence, the reset piston 66 moves to the right. This provides a collapsing action to the threading tools 68 in the threading head 21.

When the third limit switch 113 was actuated, contacts 114 were opened and this de-energized the clamp relay CL opening the contacts CL1 to de-energize the traverse relay T. The contacts T2 thereof are of the delayed opening type and this provides a sufficient time delay to assure that the threading head 21 has collapsed before feed is discontinued. Feed is discontinued at the opening of the traverse relay contacts T2 by de-energization of the feed relay F and of the feed solenoid 82. This causes the lateral piston 49 to retract, and retract the stylus 41 away from the master thread 45. Accordingly, the master thread no longer holds the servo valve spool 33 slightly opened to the right of neutral and, instead, the valve spring 39 pushes the valve spool 33 to the position shown in FIGURE 2. This opens the large area chamber 27 to the sump and, hence, pressure fluid in the small area chamber 29 permits rapid traverse return to the right of this piston and of the slide 13. The de-energization of the traverse relay T, set out above, has opened the contacts T1 and de-energized the traverse solenoid 79. This permits the traverse piston 57 to be moved back to the left to the position shown in FIGURES 1 and 2.

The rapid traverse to the right may be terminated by the main piston 16 bottoming in the main cylinder 15. Just prior to this termination, the traverse dog 105 actuates the first limit switch 111. This opens the contacts 116 thereof and closes contacts 117. The collapse relay C is therefore de-energizing and the closing of the first limit switch contacts 117 energizes the reset relay R and energizes the reset solenoid 87. This moves the reset piston 66 back to the left to reset the threading head 21 ready for another threading operation. When the clamp 23 is opened to release the threaded workpiece 22, this de-actuates the clamp switch 99. This closes contacts 101 thereof to energize the clamp relay CL. The circuit is then in readiness for another cycle of operation as set forth above.

The invention provides both a rapid traverse movement to a machine and also a feed mechanism directly in accordance with a master thread through a closed loop servo motor system. The rapid traverse piston 57 provides a means for actuating the servo valve spool 33 independently of the master thread 45 to obtain rapid traverse movements of the threading head 21. When the stylus tip 44 is in engagement with the rotating master thread 45, this provides a controlled feed movement of the threading head 21 directly in accordance with the master thread and directly in accordance with the rotational speed thereof. The stylus 41 and master thread 45 provide the pattern and tracer control for the feed mechanism of the invention. This is especially suited to a threading machine to thread a workpiece 22.

The feed rate may be varied simply by removing the master thread 45 from the arbor 46 and substituting another master thread of a different thread pitch. Accordingly, the feed rate will be changed in accordance with the new master thread. Further, any feed rate may be achieved, even odd feed rates and including those impossible to obtain by standard or conventional pitch lead screws and conventional change gears.

The feed mechanism of the present invention utilizes hydraulic power in a servo control system to maintain constant feed regardless of changes in viscosity of the hydraulic fluid. This is because a decrease in viscosity of the fluid, as caused for example, by the machine warming up, will result in a slightly smaller opening at the land 37 in the servo valve 31 to, thus, automatically compensate for this decreased viscosity.

The threading machine 11 is an example of one type of machine which may utilize the feed mechanism of the invention. The main hydraulic cylinder and piston 15, 16 establishes movement of the slide which establishes relative axial movement between the threading head 21 and the workpiece 22. The motor 20 establishes relative rotation between the threading head 21 and the workpiece 22. The servo control valve 31 is connected to the hydraulic pressure source 35 to control fluid flow to the hydraulic cylinder 15 and, thus controls movement of the piston 16. Movement of the stylus 41 axially or longitudinally of the master thread 45 moves the valve spool 33 and, hence, provides relative movement between the valve spool 33 and the valve body 32 in accordance with the relative axial movement of the stylus 41 and master thread 45. The mounting of the master thread 45 on the arbor 46 for axial movement of this master thread 45 in accordance with axial movement of the slide 13 provides relative movement between the valve spool 33 and valve body 32 in accordance with the axial movement of the slide 13 on the frame 12. This provides the follow-up movement and, hence, establishes the closed loop servo system. Accordingly, rotation of the master thread 45 effects relative axial movement of the stylus 41 and master thread 45 to relatively move the valve spool 33 and valve body 32 in a first direction and thus move slide 13 directly in accordance with the master thread 45. This is a leftward feed movement in a first direction.

The spring means 39 within the servo valve 31 relatively moves the valve spool and body in a second direction toward a position effecting movement of the slide toward the right, which is a second direction opposite to the leftward feeding direction. The rapid traverse piston 57 is a hydraulic power means to relatively move the valve spool and body in the first direction to rapidly traverse the slide in the first or leftward direction independently of the master thread.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A machine comprising, in combination, a frame having an axis, a slide movable parallel to said axis on said frame, a hydraulic piston and cylinder, a source of hydraulic pressure, means connecting said piston and cylinder to establish axial movement of said slide, a control valve having a spool in a body, means connecting said control valve to said pressure source and to said hydraulic piston and cylinder to control relative movement of same, a master thread and a cooperable stylus, means connecting said valve spool and body for relative movement in accordance with the relative longitudinal movement of said stylus and master thread, means connecting said valve spool and body for relative movement in accordance with the axial movement of said slide on said frame, hydraulic means to relatively laterally move said stylus and master thread into engagement, means to relatively rotate said master and stylus to effect relative longitudinal movement of said stylus and master thread to relatively move said valve spool and valve body in a first direction and thus move said slide in a first direction in direct accordance with said master thread, means to control said hydraulic means to relatively laterally separate said stylus and master thread, and hydraulic power means to relatively move said valve spool and body in said first direction to rapidly traverse said slide in said first direction independent of said master thread.

2. A threading machine for threading a workpiece comprising, in combination, a frame having an axis, a threading tool, means to relatively rotate said tool and a workpiece on said axis, a hydraulic piston and cylinder, means connecting said piston and cylinder to establish relative axial movement between said tool and any said workpiece, a source of hydraulic pressure, a control valve having a spool in a body, means connecting said control valve to said pressure source and to said hydraulic piston and cylinder to control relative movement of same, a master thread and a cooperable stylus, means connecting said valve spool and body for relative movement in accordance with the relative longitudinal movement of said stylus and master thread, means connecting said valve spool and body for relative movement in accordance with the relative axial movement of said tool and workpiece, hydraulic means to relatively laterally move said stylus and master thread into engagement, and means to relatively rotate said master and stylus at a speed directly related to the relative rotation of said tool and workpiece to effect relative longitudinal movement of said stylus and master thread to relatively move said valve spool and valve body and thus to thread a workpiece in direct accordance with said master thread.

3. A threading machine for threading a workpiece comprising, in combination, a frame having an axis, a threading tool, means to relatively rotate said tool and a workpiece on said axis, a slide movable parallel to said axis, one of said tool and work piece carried on said slide to be axially movable to form a thread on said workpiece, a hydraulic piston and cylinder, one of said piston and cylinder connected to said frame and the other of said piston and cylinder connected to move said slide, a source of hydraulic pressure, a control valve having a spool in a body, means connecting said control valve to said pressure source and to said hydraulic piston and cylinder to control relative movement of same, a master thread and a cooperable stylus, means connecting said valve spool and body for relative movement in accordance with the relative longitudinal movement of said stylus and master thread, means connecting said valve spool and said body for relative movement in accordance with movement of said slide, hydraulic means to relatively laterally move said stylus and master thread into engagement, means to relatively rotate said master and stylus at a speed directly related to the relative rotation of said tool and workpiece to effect relative longitudinal movement of said stylus and master thread to relatively move said valve spool and valve body and thus move said slide to thread a workpiece in direct accordance with said master thread, means to control said hydraulic means to relatively laterally separate said stylus and master thread, and hydraulic power means to relatively move said valve spool and body to rapidly traverse said slide independent of said master thread.

4. A threading machine for threading a workpiece comprising, in combination, a frame having an axis, a threading tool, means to relatively rotate said tool and a workpiece on said axis, a slide movable parallel to said axis, one of said tool and workpiece carried on said slide to be axially movable to form a thread on said workpiece, a hydraulic piston and cylinder, one of said piston and cylinder connected to said frame and the other of said piston and cylinder connected to move said slide, a source of hydraulic pressure, a control valve having a spool in a body, means connecting said control valve to said pressure source and to said hydraulic piston and cylinder to control relative movement of same, a master thread and a cooperable stylus, means connecting said valve and body for relative movement in accordance with the relative movement of said stylus and master thread longitudinally of said master thread, means connecting said valve spool and said body for relative movement in accordance with movement of said slide, hydraulic means to relatively laterally move said stylus and master thread into engagement, means to relatively rotate said master and stylus at a speed directly related to the relative rotation of said tool and workpiece to effect relative longitudinal movement of said stylus and master thread to relatively move said valve spool and valve body in a first direction and thus move said slide in a first axial direction to thread a workpiece in direct accordance with said master thread, means to control said hydraulic means to relatively laterally retract said stylus and master thread to terminate said thread forming, and means to relatively move said valve spool and valve body in the opposite direction to cause said hydraulic pressure to move said slide in a second axial direction.

5. A threading machine for threading a workpiece comprising, in combination, a frame having an axis, a threading tool, means to relatively rotate said tool and a workpiece on said axis, a slide movable parallel to said axis, one of said tool and workpiece carried on said slide to be axially movable to form a thread on said workpiece, a hydraulic piston and cylinder, one of said piston and cylinder connected to said frame and the other of said piston and cylinder connected to move said slide, first and second chambers in said cylinder on opposite sides of said piston, a source of hydraulic pressure connected to said first chamber, a control valve having a spool in a body and having an input connected to said pressure source, a control output on said valve controllable by said spool and connected to said second chamber, a master thread and a cooperable stylus, means connecting one of said valve spool and body for movement in accordance with the relative longitudinal movement of said stylus and master thread, means connecting said valve spool and said body for relative movement in accordance with movement of said slide, hydraulic means to relatively laterally move said stylus and master thread into engagement, and means to relatively rotate said master and stylus at a speed directly related to the relative rotation of said tool and workpiece to effect relative longitudinal movement of said stylus and master thread to relatively move said valve spool and body and thus cause fluid pressure to increase in said second chamber to effect movement of said slide to thread a workpiece in direct accordance with said master thread.

6. A threading machine for threading a workpiece comprising, in combination, a frame having an axis, a threading tool, means to relatively rotate said tool and a workpiece on said axis, a slide movable parallel to said axis, one of said tool and workpiece carried on said slide to be axially movable to form a thread on said workpiece, a hydraulic piston and cylinder, one of said piston and cylinder connected to said frame and the other of said piston and cylinder connected to move said slide, first and second chambers in said cylinder on opposite sides of said piston, a source of hydraulic pressure connected to said first chamber, a control valve having a spool in a body and having an input connected to said pressure source, a control output on said valve controllable by said spool and connected to said second chamber, a master thread and a cooperable stylus, means connecting said valve spool and body for relative movement in accordance with the relative movement of said stylus and master thread longitudinally of said master thread, means connecting said valve spool and said body for relative movement in accordance with movement of said slide, hydraulic means to relatively laterally move said stylus and master thread into engagement, means to relatively rotate said master and stylus at a speed directly related to the relative rotation of said tool and workpiece to effect relative longitudinal movement of said stylus and master thread to relatively move said valve spool and valve body in a first direction and thus cause fluid pressure to increase in said second chamber to effect movement of said slide in a threading direction to thread a workpiece in direct accordance with said master thread, means to control said hydraulic means to relatively laterally retract said stylus and master thread to terminate said thread forming, and means to relatively move said valve spool and valve body in the opposite direction to cause said hydraulic pressure to move said slide in a direction opposite to said threading direction.

7. A threading machine for threading a workpiece comprising, in combination, a frame having an axis, a threading tool, means to relatively rotate said tool and a workpiece on said axis, a slide movable parallel to said axis, one of said tool and workpiece carried on said slide to be axially movable to form a thread on said workpiece, a hydraulic piston and cylinder, one of said piston and cylinder connected to said frame and the other of said piston and cylinder connected to move said slide, first and second chambers in said cylinder on opposite sides of said piston, a source of substantially constant hydraulic pressure connected to said first chamber, a control valve having a spool in a body and having an input connected to said pressure source, an output on said valve restrictable by said spool and connected to said second chamber, a master thread and a cooperable stylus, linkage between said stylus and said valve spool to move same upon axial movement of said stylus, means connecting said valve spool and body for relative movement in accordance with movement of said slide, means to relatively laterally move said stylus and master thread into engagement, means to relatively rotate said master and stylus at the same speed as the relative rotation of said tool and workpiece to move said stylus axially of said master thread to move said valve spool in a first direction in said valve body and thus cause fluid pressure to increase in said second chamber to effect movement of said slide in a threading direction to thread a workpiece in direct accordance with said master thread, means to relatively laterally retract said stylus and master thread to terminate said thread forming, and means to move said valve spool in the opposite direction to cause said hydraulic pressure to move said slide in a direction opposite to said threading direction.

8. A threading machine for threading a workpiece comprising, in combination, a frame having an axis, a threading tool, means to relatively rotate said tool and a workpiece on said axis, a slide movable parallel to said axis, one of said tool and workpiece carried on said slide to be axially movable to form a thread on said workpiece, a differential hydraulic piston and cylinder, one of said piston and cylinder connected to said frame and the other of said piston and cylinder connected to move said slide, large and small area sides of said piston, a source of substantially constant hydraulic pressure connected to said small area side of said piston, a control valve having a spool in a body and having an input connected to said pressure source, an output on said valve restrictable by said spool and connected to said large area side of said piston, a master thread and a cooperable stylus, means to relatively rotate said master and stylus at the same speed as the relative rotation of said tool and workpiece to move said stylus axially of said master thread, linkage between said stylus and said valve spool to move same upon movement of said stylus axially of said master thread, means connecting said valve body to said frame, whereby upon engagement of said stylus and master thread and relative rotation therebetween said stylus moves axially of said master thread and moves said valve spool in said valve body in a first direction and thus causes fluid pressure to increase against said large area piston side to effect movement of said slide in a threading direction to thread a workpiece in direct accordance with said master thread, means to laterally retract said stylus from said master thread to terminate said workpiece threading, and means to move said valve spool in the opposite direction to cause said hydraulic pressure to move said slide in a direction opposite to said threading direction.

9. A machine comprising, in combination, a frame having an axis,
a tool,
means to relatively rotate said tool and a workpiece on said axis,
a hydraulic piston and cylinder,
means connecting said piston and cylinder to establish relative axial movement between said tool and any said workpiece,
a source of hydraulic pressure,
a control valve having a spool in a body,
means connecting said control valve to said pressure source and to said hydraulic piston and cylinder to control relative movement of same,
a generally cylindrical master having an axis and having a groove thereon extending both longitudinally and circumferentially,
a stylus cooperable with said groove on said master,
means connecting said valve spool and body for relative movement in accordance with the relative longitudinal movement of said stylus and master,
means connecting said master to be longitudinally moved in accordance with the relative axial movement of said tool and workpiece,
hydraulic means to relatively laterally move said stylus and master into engagement,
and means to relatively rotate said master and stylus about the axis of said master at a speed directly related to the relative rotation of said tool and workpiece to effect relative longitudinal movement of said stylus and master to relatively move said valve spool and valve body and thus to relatively move said tool and workpiece in direct accordance with said master.

10. A machine comprising, in combination, a frame having an axis,
a tool,
means to relatively rotate said tool and a workpiece on said axis,
a slide movable parallel to said axis,
one of said tool and workpiece carried on said slide to be axially movable to form a thread on said workpiece,
a hydraulic piston and cylinder,
one of said piston and cylinder connected to said frame and the other of said piston and cylinder connected to move said slide,
a source of hydraulic pressure,
a control valve having a spool in a body,
means connecting said control valve to said pressure source and to said hydraulic piston and cylinder to control relative movement of same,
a generally cylindrical master having an axis and having a groove thereon extending both longitudinally and circumferentially,
a stylus cooperable with said groove on said master,
means connecting said valve spool and body for relative movement in accordance with the relative longitudinal movement of said stylus and master,
means connecting said valve spool and said body for relative movement in accordance with movement of said slide,
hydraulic means to relatively laterally move said stylus and master into engagement,
means to relatively rotate said master and stylus about the axis of said master at a speed directly related to the relative rotation of said tool and workpiece to effect relative longitudinal movement of said stylus and master to relatively move said valve spool and valve body and thus move said slide in direct accordance with said master,
means to control said hydraulic means to relatively laterally separate said stylus and master,
and hydraulic power means to relatively move said valve spool and body to rapidly traverse said slide independent of said master.

References Cited by the Examiner
UNITED STATES PATENTS 2,601,157   6/52   Le Lan _____ 10—105
2,994,305   8/61   Bruet _____ 91—380

ANDREW R. JUHASZ, Primary Examiner.
CARL W. TOMLIN, Examiner.